(12) United States Patent
Hammerschmidt

(10) Patent No.: US 9,031,769 B2
(45) Date of Patent: May 12, 2015

(54) SENSOR CURRENT INTERFACE TRANSCEIVER WITH ADAPTIVE LINEARIZATION

(75) Inventor: Dirk Hammerschmidt, Villach (AT)

(73) Assignee: Infineon Technologies AG, Neubiberg (DE)

( * ) Notice: Subject to any disclaimer, the term of this patent is extended or adjusted under 35 U.S.C. 154(b) by 444 days.

(21) Appl. No.: 13/603,897

(22) Filed: Sep. 5, 2012

(65) Prior Publication Data

US 2014/0062582 A1    Mar. 6, 2014

(51) Int. Cl.
*F02D 41/26*    (2006.01)
*G05F 1/10*    (2006.01)

(52) U.S. Cl.
CPC .............. *F02D 41/26* (2013.01); *F02D 41/266* (2013.01)

(58) Field of Classification Search
CPC ... F02D 41/26; F02D 41/266; F02D 41/2422; G05B 11/42; G05B 13/024; G05F 1/10; G05F 1/02
USPC ........ 701/115; 700/1, 40, 42; 702/85, 86, 100
See application file for complete search history.

(56) References Cited

U.S. PATENT DOCUMENTS

| 6,687,644 | B1 |  | 2/2004 | Zinke et al. |  |
|---|---|---|---|---|---|
| 7,499,819 | B2 | * | 3/2009 | Kanke et al. | 702/100 |
| 2014/0316679 | A1 | * | 10/2014 | Nishida et al. | 701/104 |

* cited by examiner

*Primary Examiner* — Hieu T Vo
(74) *Attorney, Agent, or Firm* — Eschweiler & Associates, LLC

(57) ABSTRACT

Some embodiments of the present disclosure relate to a sensor interface module having a linearization module that increase a size of a linear region of a current output from a high-side current source. The disclosed sensor interface module has a reference voltage source configured to generate a reference signal. An output driver stage having a high-side current source and a low-side current source is connected in series at an output node of the sensor interface module. A closed control loop configured to receive the reference signal and to generate a digital control signal that drives the high-side current source. A linearization module configured to operate the low-side current source to approximate a nonlinearity of the high-side current source and to use the approximated nonlinearity to generate a compensation function that mitigates nonlinearities in the high side current source.

22 Claims, 7 Drawing Sheets

SENSOR CURRENT INTERFACE TRANSCEIVER WITH ADAPTIVE LINEARIZATION

BACKGROUND

Modern vehicles include a vast array of sensors, such as air bag sensors, tire pressure sensors, engine sensors, seat belt sensors, and many others. The air bag sensors, for example, provide data about the vehicle's operation (e.g., wheel speed, deceleration, etc.) to an automotive control unit (ACU). Based on the data received from the air bag sensors, the ACU can determine when air bags within a vehicle should be deployed.

FIG. 1 shows a vehicular sensing system 100 including a sensor interface module 102. The sensor interface module 102 has a control unit interface 104 coupled to an automotive control unit 106 and a sensor interface 108 coupled to a pair of wires 110, 112 that are connected to one or more sensors 114 (e.g., 114a, . . . 114n). To limit noise and attenuate the line resonance, an RLC network 116 can be coupled to the sensor interface 108.

To transmit information to the sensors 114, the sensor interface module 102 includes a modulation unit 118, which modulates a supply voltage (e.g., a change in the DC supply voltage) to transmit information to at least one of the sensors 114. When data is not transmitted, the modulation unit 118 often provides an un-modulated (e.g., DC) supply voltage to the sensors 114. To receive information from the sensors 114, the sensor interface module 102 includes a demodulation unit 120, which demodulates a modulated sensor current signal to receive information from at least one of the sensors 114.

A physical interface layer 122 may be positioned between the modulation and demodulation units, 118 and 120, and wires 110 and 112 in order to allow for a current measurement to be made by the demodulation unit 120, which is connected in parallel to the modulation unit 118. The physical interface layer 122 may also include filters for antialiasing of input signals or for removing quantization noise from an output signal. It can also include measures to assure EMC and ESD compliance and protection against short circuits, or switches to change between different supplies. These functions are only examples and should not be seen as restrictions.

DETAILED DESCRIPTION

Figure 1:
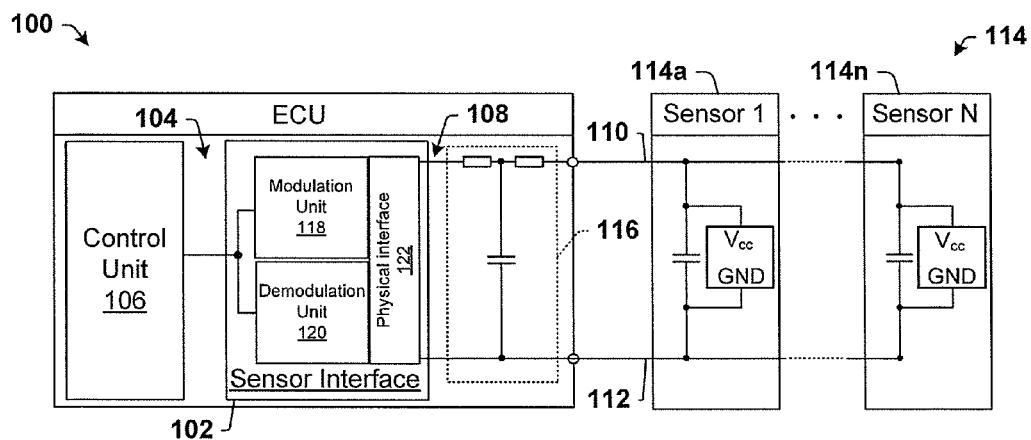
FIG. 1 is a block diagram of a vehicular sensing system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Figure 2A:
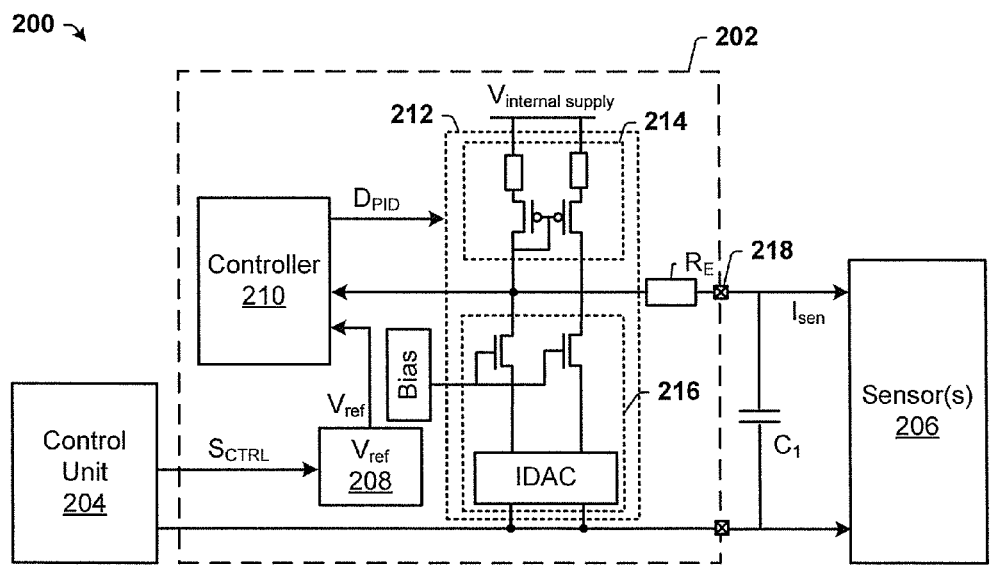
FIG. 2A is a block diagram of an automotive control unit having a sensor interface module with high-side and low-side current sources.

FIG. 2A illustrates a more detailed block diagram of an automotive control unit 200 having a sensor interface module 202 configured to exchange data signals between a control unit 204 and one or more sensors 206.

The sensor interface module 202 comprises a reference voltage source 208 configured to receive a control signal $S_{CTRL}$ from the control unit 204 and to generate a variable reference signal $V_{ref}$ based thereupon. The reference voltage source 208 is coupled to a closed control loop 210 that generates a digital control signal $D_{PID}$ based upon the variable reference voltage $V_{ref}$. The digital control signal $D_{PID}$ is provided to an output driver stage 212 that regulates an output voltage at output node 218.

The output driver stage 212 comprises a high-side current source 214 and a low-side current source 216. To increase the output voltage at output node 218, the current generated by the high-side current source 214 is increased. Alternatively, to decrease the output voltage at output node 218, the current generated by the high-side current source 214 is decreased, and the current generated by the low-side current source 216 is increased. The high-side current source 214 may comprise a current mirror having PMOS transistors with different size ratios (e.g., a 1:200 width ratio). Since the PMOS transistors are operated to provide current most of time (e.g., duty cycle of PMOS is 98%, NMOS is active for 2%), the PMOS transistors account for almost a majority of the power consumption of the sensor interface module 200.

Figure 2B:
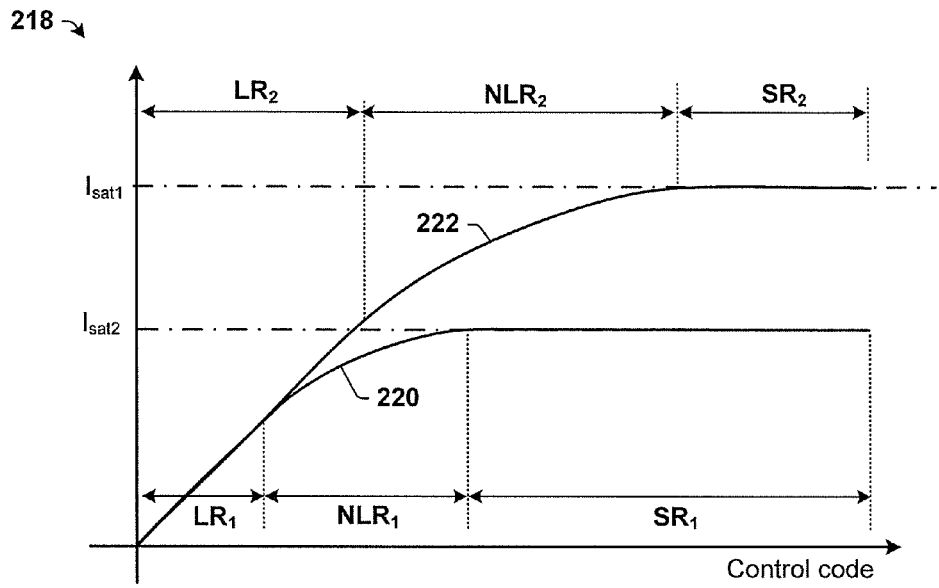
FIG. 2B is a graph showing the output voltage of the high-side current source as a function of a digital control signal.

FIG. 2B illustrates a graph showing an output current 220 of a PMOS transistor within the high-side current source 214 as a function of a digital control signal $D_{PID}$. When the digital control signal $D_{PID}$ is small, the PMOS transistor operates in a linear region $LR_1$ where the output current 220 is linear with respect to the digital control signal $D_{PID}$. As the digital control signal $D_{PID}$ increases to operate the PMOS transistor to deliver a high current (e.g., for systems having multiple sensors), the output current 220 enters into a nonlinear region $NLR_1$ where the digital control signal $D_{PID}$ increases without a corresponding increase of output current 220. Therefore, in the nonlinear region $NLR_1$, the nonlinearity of the PMOS transistors causes the digital control signal $D_{PID}$ to include a non-linearity since the digital control signal $D_{PID}$ will unproportionally increase to compensate for saturating current.

Since the digital control signal $D_{PID}$ is used to demodulate a received sensor signal, a high degree of nonlinearity can cause the automotive control unit to malfunction.

One way to prevent the PMOS transistor from entering into a saturation region is to increase the size of the PMOS transistors. For example, in FIG. 2B the output current 222 of a larger transistor, which enters into a saturation region $SR_2$ at a larger digital control signal value than the value that causes the smaller transistor (output current 220) to enter into a saturation region $SR_1$. Therefore, to operate the output driver stage 212 of the automotive control unit 200 in a linear region of operation large transistors can be used or sufficient drain source voltages on the high side can be applied. However, large transistors are undesirable since their large size consume a large chip area, which increases chip cost. High drain source voltages are not acceptable as well since they increase the power consumption.

Accordingly, the present disclosure relates to a method and apparatus to reduce the size and power consumption of a high-side current source by using a compensation function to increase a range of digital control signals over which a high-side current output from a high-side current source exhibits a linear response.

In some embodiments, the apparatus comprises a reference voltage source configured to provide a variable reference voltage to a closed control loop in communication with an output driver stage. The output driver stage has a high-side current source configured to produce a high-side current connected in series at an output node with a low-side current source configured to produce a low-side current. In response to the variable reference voltage, the closed control loop generates a digital control signal that drives the high-side current source to generate a high-side current. A linearization module is configured to provide a control code that varies the low-side current, generated by the low-side current source. Changes in the low-side current cause the digital control signal to change, so that the linearization module can determine one or more characteristics of nonlinearity of the high-side current source or the low-side current source from the control code and an associated digital control signal. Based upon the characteristics of nonlinearity, the linearization module determines a compensation function that is used to reduce nonlinearities in the output driver stage.

Figure 3:
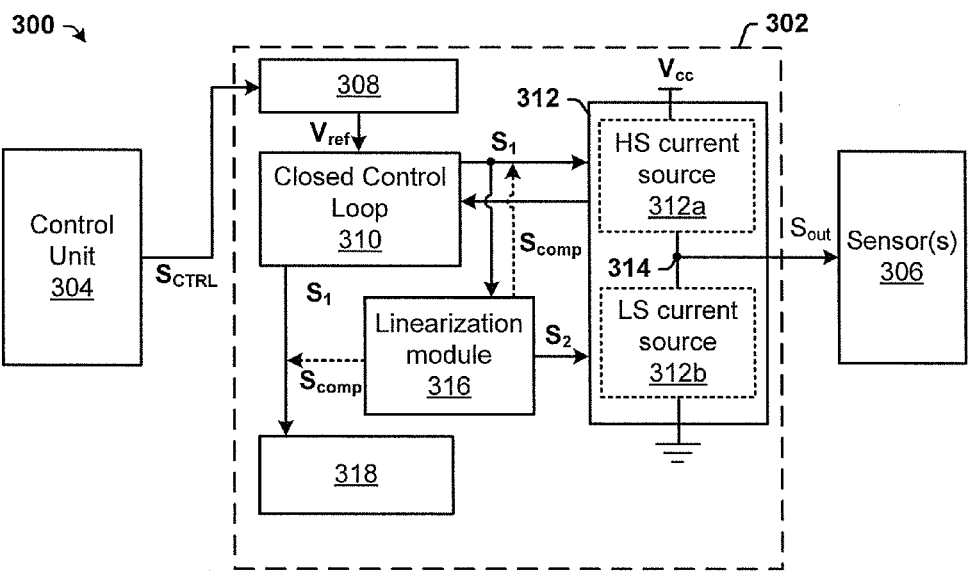
FIG. 3 is a block diagram of some embodiments of a sensor interface module having a linearization module configured to increase the linearity associated with a current output from a current source that is operated to generate an output signal.

FIG. 3 illustrates a block diagram of some embodiments of an automotive control unit 300 having a sensor interface module 302 configured to exchange data between a control unit 304 and one or more sensors 306. The sensor interface module 302 is configured to receive a control signal $S_{CTRL}$ from a control unit 304 and to generate an output signal $S_{out}$ based upon the control signal, which is provided to the one or more sensors 306.

In particular, the control signal $S_{CTRL}$ is provided to a reference voltage source 308 that provides a reference voltage, based upon the control signal $S_{CTRL}$, to a closed control loop 310. The closed control loop 310 is configured to generate a first signal $S_1$ that controls an output driver stage 312 to generate the output signal $S_{out}$. The output driver stage 312 comprises a high side current source 312a connected between a supply voltage $V_{CC}$ and output node 314 and a low side current source 312b connected between a ground terminal and the output node 314.

Under normal operation conditions, either the high side current source 312a or the low side current source 312b may be operated to generate the output signal $S_{out}$. The first signal controls a value of the output signal $S_{out}$ by controlling a current produced by current source 312a or 312b. For example, in some embodiments, the first signal $S_1$ controls operation of the high-side current source 312a to generate the output signal $S_{out}$, while in other embodiments, the first signal $S_1$ controls operation of the low-side current source 312b to generate the output signal $S_{out}$.

A linearization module 316 is configured to generate a second signal $S_2$ that modifies the current of a current source that is not operated to generate the output signal $S_{out}$ under normal operation conditions. The linearization module 316 measures a response of the current source that is operated to generate the output signal $S_{out}$ and based upon the measured response calculates a nonlinearity of the current source that is operated to generate the output signal $S_{out}$. The linearization module 316 is further configured to generate a compensation signal $S_{comp}$ from the calculated nonlinearity, which can be used to increase the size of a linear region of operation between a current output from the output driver stage 312 and a signal which is used inside a processing block 328 that makes use of the signal as representation of the current.

For example, for sensors 308 connected between the output node 314 and a ground terminal, the first signal $S_1$ operates the high-side current source 312a to generate the output signal $S_{out}$ and the second signal $S_2$ output from the linearization module 316 modifies the low-side current which goes in the same direction as the high-side current. The linearization module 316 measures the response on the first signal $S_1$ and based upon the measured response calculates the nonlinearity of the high-side current source 312a.

For sensors connected between the output node 314 and a high-side supply voltage, the first signal $S_1$ operates the low-side current source 312b to generate the output signal $S_{out}$ and the second signal $S_2$ output from the linearization module 316 modifies the high-side current which goes in the same direction as the low side current. The linearization module 316 measures the response on the first signal $S_1$ and based upon the measured response calculates the nonlinearity of the low-side current source 312b.

Figure 4:
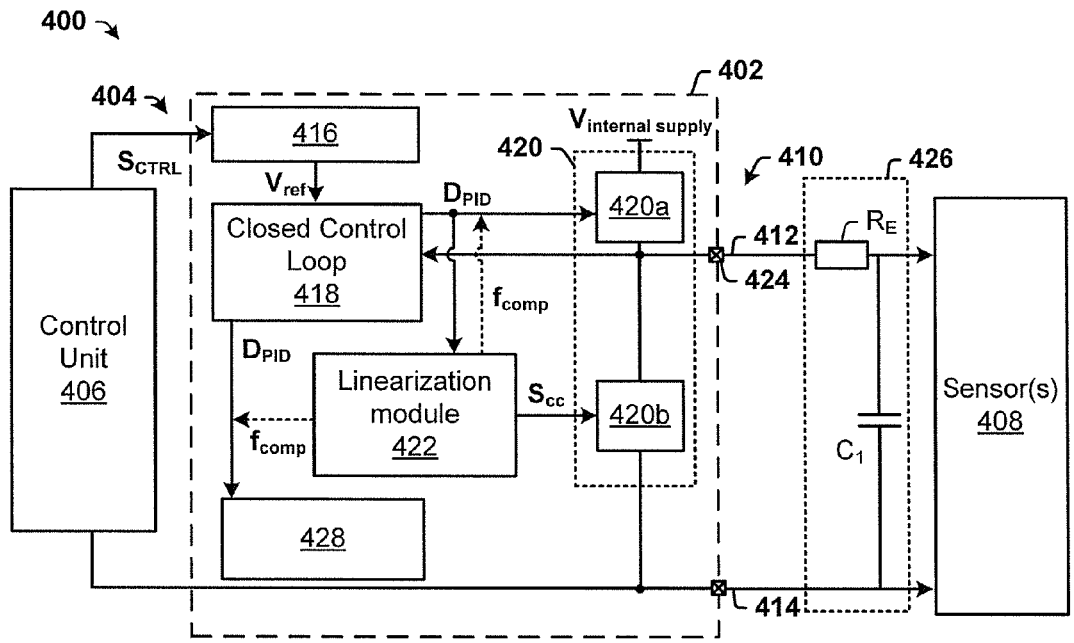
FIG. 4 is a block diagram of some additional embodiments of a sensor interface module having a linearization module configured to increase the linearity associated with a current output by a high-side current source.

FIG. 4 illustrates a block diagram of some additional embodiments of an automotive control unit 400 (e.g., an engine control unit, an airbag control unit, etc.) having a sensor interface module 402 configured to exchange data signals between a control unit 406 and one or more sensors 408.

The sensor interface module 402 comprises a control unit interface 404 that interfaces to the control unit 406 and a sensor interface 410 that interfaces to the pair of wires 412, 414 coupled to one or more sensors 408. The sensor interface module 402 further comprises a reference voltage source 416 configured to receive a control signal $S_{CTRL}$ from control unit 406 and to generate a variable reference signal $V_{ref}$ based thereupon. The reference voltage source 416 is coupled to a closed control loop 418, which generates a digital control signal $D_{PID}$ that is provided to a control terminal of an output driver stage 420. The digital control signal $D_{PID}$ drives the output driver stage 420 to regulate an output voltage at output node 424.

The output driver stage 420 comprises a high-side current source 420a and a low-side current source 420b connected in series at an output node 424 of the sensor interface module 402. In some embodiments, the high-side current source comprises current mirror having first PMOS transistor having a first width and a second PMOS transistor having a second width larger than the first width.

In some embodiments, the control unit 406 is configured to drive the reference voltage source 416 to generate a variable reference voltage $V_{ref}$ corresponding to signals that are to be sent to the one or more sensors 408. Based upon the variable reference voltage $V_{ref}$, the closed control loop 418 adjusts the digital control signal $D_{PID}$ until the voltage at output node 424 matches the variable reference voltage $V_{ref}$. In some embodiments, a damping network 426 comprising a resistor, capacitor, and/or an inductor is located between the sensor interface 410 and the one or more sensors 408. The damping network 426 is configured to dampen the resonance between the line inductance and capacitors on the sensor side as well as on the control unit side.

A linearization module 422 is connected to the closed control loop 418 and to the output driver stage 420. The linearization module 422 is configured to provide a control code $S_{cc}$ to the low-side current source 420b, which controls the low-side current output by the low-side current source 420b. The linearization module 422 is also configured to receive the digital control signal $D_{PID}$ that drives the high-side current source 420a.

During normal operation, the closed control loop 418 controls an output current of the output driver stage 420 by operation of the high side current source 420a. However, in a calibration mode the linearization module 422 is configured to perform a calibration procedure that determines a compensation function that mitigates a nonlinearity in the high-side current source or the low-side current source. The linearization module 422 determines the compensation function by controlling the current generated by the low-side current source 420b in a controlled manner, and by determining a non-linearity of the high-side current source 420a or the low-side current source 420b based upon a comparison of the low-side control code $S_{cc}$ and the high side control signal $D_{PID}$. From the nonlinearity a compensation function is determined.

For example, if the current generated by the low-side current source 420b is varied within a non-linear region of operation for the high-side current source 420a, the digital control signal $D_{PID}$ output from the closed control loop 418 will vary in a non-linear manner. In some embodiments, the linearization module 422 varies the low-side current by modifying the low-side control code (e.g. by adding offset steps), while in other embodiments the linearization module 422 is configured to operate an additional low-side current source to generate a low-side current that is added to the currents at the output node or somewhere inside the output driver stage 420.

In some embodiments, the linearization module 422 is configured to dynamically perform the calibration process to account for changes in the nonlinearity. For example, in some embodiments the calibration procedure is performed by adjusting a value of the control code $S_{cc}$, and thereby adjusting the low-side current. Adjusting the low-side current causes a change in a high-side current generated by the high-side current source 420a, and therefore a change in the digital control signal $D_{PID}$.

In some embodiments, since the sensor interface module 402 alternatively transmits and receives data to the sensors 408, the calibration procedure may be configured to measure the digital control signal $D_{PID}$ and the control code $S_{cc}$ over normal operation cycles, while changes to the low-side current (e.g., changes in the low-side control code $S_{cc}$) are made between data that is received from the sensors 408.

The linearization module 422 is able to determine one or more data characteristics of a high-side current source non-linearity from the control code $S_{cc}$ and a response associated with the high-side current source 420a. For example, in some embodiments, the linearization module 422 is able to determine one or more data characteristics of a high-side current source nonlinearity from the control code $S_{cc}$ and a corresponding digital control signal $D_{PID}$. In other embodiments, the linearization module 422 is able to determine one or more data characteristics of a high-side current source nonlinearity from the control code $S_{cc}$ and a corresponding high-side current provided to the one or more sensors 408.

The linearization module 422 is configured to use the one or more data characteristics to approximate a nonlinearity of the high-side current source 420a. The approximated nonlinearity can be used to generate a compensation function that mitigates the nonlinearity associated with the high-side current source 420a, thereby effectively increasing a size of a region of linear operation of the high-side current source 420a. In various embodiments, in order to mitigate the nonlinearity, the linearization module 422 can introduce the compensation function at the input of the high-side current source 420 or at the input of a processing block 428 that uses the digital control signal $D_{PID}$ as a representation of a quiescent current provided to the sensors 408. For example, in some embodiments, the linearization module 422 can introduce the compensation function at the input of a processing block 428 comprising a receiver configured to demodulate signals received from the one or more sensors 408.

By mitigating the nonlinearity associated with the high-side current source 420a, the size of the high-side current source 420a can be reduced (e.g., reducing chip area) and/or the supply voltage of the high-side current source 420a can be reduced (e.g., reducing power consumption).

Figure 5:
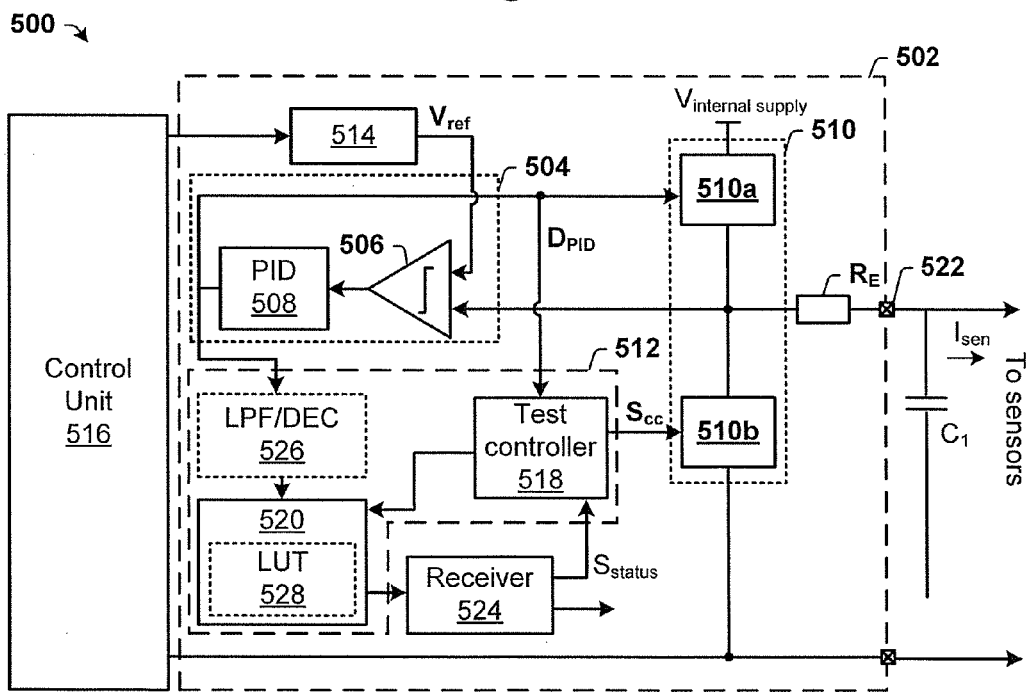
FIG. 5 is a block diagram of some additional embodiments of a sensor interface module having a linearization module configured to increase the linearity associated with a current output by a high-side current source.

FIG. 5 illustrates a block diagram of a some more detailed embodiments of an automotive control unit 500 having a sensor interface module 502 comprising a linearization module 512 configured to mitigate nonlinearities associated with a high-side current source 510a. The linearization module 512 is configured to mitigate the nonlinearity, introduced by the high-side current source 510a, from a digital control signal $D_{PID}$ before the control signal is received by a receiver 524.

In particular, sensor interface module 502 comprises a closed control loop 504 comprising a comparison element 506 and a PID (proportional-integral-derivative) controller 508. The comparison element 506 (e.g., a comparator, an analog-to-digital converter) has a first input connected to a voltage reference source 514 and a second input configured to receive a feedback signal from output node 522. The voltage reference source 514 is configured to output a reference voltage $V_{ref}$ that controls the voltage at output node 522. An output signal of the comparison element 506 is coupled to an input of the PID controller 508, which is configured to generate a digital control signal $D_{PID}$ that is provided to an output driver stage 510 having a high-side current source 510a and a low-side current source 510b. Since the closed control loop 504 generates the digital control signal $D_{PID}$ based upon a voltage at output node 522, which is controlled by the high-side current source 510a, the digital control signal $D_{PID}$ will contain nonlinearities caused by the nonlinear characteristic of e high-side current source 510a.

Sensor interface module 502 further comprises a linearization module 512 comprising a test controller 518 and an adaptive nonlinearity block 520. The test controller 518 comprises first and second output nodes. The first output node is connected to the output driver stage 510 and is configured to output a control code $S_{cc}$ to the low-side current source 510b. The second output node is connected to the adaptive nonlinearity block 520. The test controller 518 further comprises a first input node connected to the output of the closed control loop 504 and configured to receive the digital control signal $D_{PID}$.

During operation, the test controller 518 is configured to perform a calibration procedure that varies the control code $S_{cc}$ provided to the low-side current source 510b, causing the low-side current source 510b to vary a value of a low-side current that it generates. In response to variations in the low-side current, the closed control loop 504 will adjust the digital control signal $D_{PID}$ provided to the high-side current source 510a. In some embodiments, the control code $S_{cc}$ is changed over a plurality of values to determine a plurality of corresponding digital control signals $D_{PID}$ associated with a high-side current output from the high-side current source 510a. Based upon the plurality of control codes $S_{cc}$ and digital control signals $D_{PID}$, the test controller 518 is configured to determine one or more data characteristics of nonlinearities in the high-side current source 510a (i.e., to determine unknown variable of nonlinear function that will approximate a nonlinearity of the high-side current source).

For example, once the sensor interface module 502 is powered up and the output voltage has settled (e.g., reached a stable state) the test controller 518 may slowly increment the control code $S_{cc}$ to increase the low-side current in a step-by-step manner. Increasing the low-side current causes a high-side current (i.e., quiescent current) output from the high-side current source 510a to change in a step-by-step manner. The test controller receives a response of the high-side current source 510a in the form of the digital control signal $D_{PID}$. As long as the high-side current source 510a is in a linear region of operation, an increase in the low-side current will lead to a proportional increase in the digital control signal $D_{PID}$ that controls the high-side current source 510a. However, when the high-side current source 510a enters into a nonlinear region of operation, an increase in the low-side current will be compensated by an un-proportional increase of the digital control signal $D_{PID}$ that accounts for the nonlinearity in the high-side current source 510a. From the un-proportional increase in the digital control signal $D_{PID}$, the test controller 518 can determine one or more data characteristics of the high-side current source nonlinearity.

The adaptive nonlinearity block 520 has a first input node connected to the output of the closed control loop 504 and a second input node connected to the test controller 518. The adaptive nonlinearity block 520 is configured to receive the digital control signal $D_{PID}$ from the closed control loop 504 and the one or more data characteristics from the test controller 518. Based upon the received signals, the adaptive nonlinearity block 520 is configured to generate a compensation function that mitigates the nonlinearity of the high-side current source 510a. In some embodiments, the compensation function is equal to the nonlinearity of the high-side current source 510a. If the adaptive nonlinearity block 520 receives a nonlinear input, the compensation function is introduced into the digital control signal $D_{PID}$ to remove the nonlinearity before the signal goes to the receiver 524, so that the signal going into the receiver 524 is linear.

In some embodiments, a filter (e.g., a low-pass filter) and/or decimator 526 located between the output of the closed control loop 504 and the adaptive nonlinearity block 520. By placing a low-pass filter and/or a decimator before the adaptive nonlinearity block 520, the complexity of the calculation use to generate the compensation function can be reduced by breaking the calculation into several sequential steps. This reduces the hardware complexity.

In some embodiments, the adaptive nonlinearity block 520 comprises a lookup table 528 that can be used to determine the nonlinearity of the high-side current source 510a. In such an embodiments, a digital control signal $D_{PID}$ and a low-side control code $S_{cc}$ are received as inputs to the lookup table 528, which gives an approximated nonlinearity based thereupon. In other embodiments, a digital control signal $D_{PID}$ and a low-side control code $S_{cc}$ are received as inputs to the lookup table 528, which gives a boundary point as an output. The adaptive nonlinearity block 520 then interpolates between boundary points to approximate a function that describes the nonlinearity of the high-side current source 510b.

In some embodiments, the test controller 518 also comprises a second input node configured to receive a status signal $S_{status}$ from the receiver 524. The status signal $S_{status}$ tells the test controller 518 whether the automotive control unit 500 is operating in a normal operating mode or in a linearity testing mode that performs the calibration procedure. In additional embodiments, the status signal $S_{status}$ may convey other information from the receiver 524 to the test controller 518 also.

Figure 6:
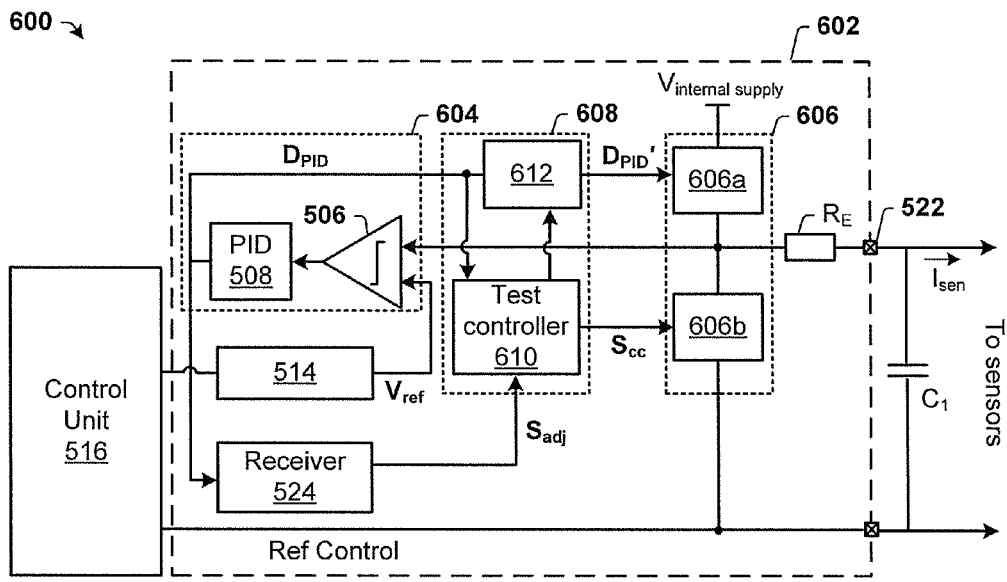
FIG. 6 is a block diagram of some alternative embodiments of a sensor interface module having a linearization module configured to increase the linearity of a current output by a high-side current source.

FIG. 6 illustrates a block diagram of some alternative embodiments of an automotive control unit 600 having a sensor interface module 602 comprising a linearization module 608 configured to mitigate nonlinearities of a high-side current source 606a. The linearization module 608 is configured to modify a digital control signal $D_{PID}$ output from a closed control loop 604 to cause the high-side current source 606a to act linearly.

In particular, the linearization module 608 comprises a test controller 610 and an adaptive nonlinearity block 612. The test controller 610 acts as described above in relation to FIG. 5. The adaptive nonlinearity block 612 is located in a control line extending between the output of a closed control loop 604 and a high-side current source 606a.

During operation, the test controller 610 is configured to perform a calibration procedure by varying the control code $S_{cc}$ provided to a low-side current source 606b, causing the low-side current source 606b to vary a value of the low-side current it generates. In response to variations in the low-side current, the closed control loop 604 will adjust the digital control signal $D_{PID}$ provided to the high-side current source 606a. In some embodiments, the control code $S_{cc}$ is changed over a plurality of values to determine a plurality of corresponding digital control signals $D_{PID}$. Based upon the plurality of control codes $S_{cc}$ and digital control signals $D_{PID}$, the test controller 610 is configured to determine one or more data characteristics of nonlinearities in the high-side current source 606a.

The one or more data characteristics are provided to the adaptive nonlinearity block 612. The adaptive nonlinearity block 612 is configured to approximate a nonlinearity of the high-side current source 606a and to generate a compensation function that is a reciprocal of the approximated nonlinearity. The compensation function is combined with the digital control signal $D_{PID}$ to generate an adapted digital control signal $D_{PID}'$. The adapted digital control signal $D_{PID}'$ accounts for the nonlinearity in the high-side current source 606a so that the high-side current source 606a delivers a linearized output current, which results in a linearized digital control signal $D_{PID}$.

Figure 7:
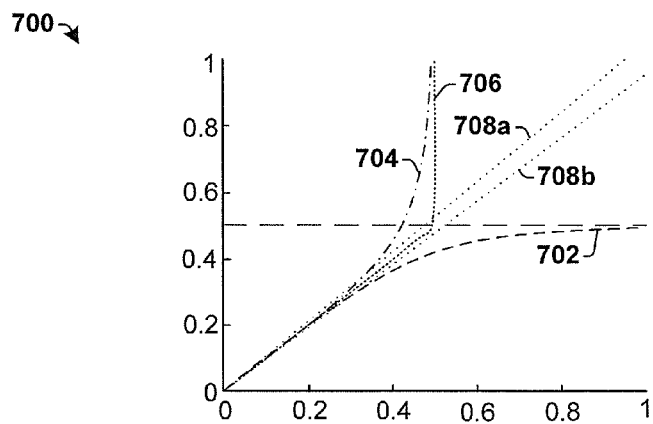
FIG. 7 is a graph showing a current output from a high-side current source and a compensation function generated by the linearization module.

FIG. 7 is a graph 700 showing a high-side current and a compensation function generated by a disclosed linearization module to account for a nonlinearity in the high-side current source.

Graph 700 illustrates a high-side current 702 having a nonlinearity and a corresponding compensation function 704 generated by an adaptive nonlinearity block. To accurately demodulate a signal received from one or more sensors, the high-side current 702 must be between a maximum value 708a and a minimum tolerance value 708b. If the high-side current 702 is outside of the maximum and minimum tolerance values, 708a and 708b, a demodulation of a modulated current received from one or more sensors may be inaccurate.

As illustrated in graph 700, the high-side current 702 is not within the maximum and minimum tolerance values, 708a and 708b. However, applying the compensation function 704 to the high-side digital control signal ($D_{PID}$), results in a linearized high-side current 706. The linearized high-side current 706 is between the maximum tolerance 708a and the minimum tolerance 708b up to a saturation limit at 0.5, and therefore provides for accurate demodulation of received signals.

Figure 8:
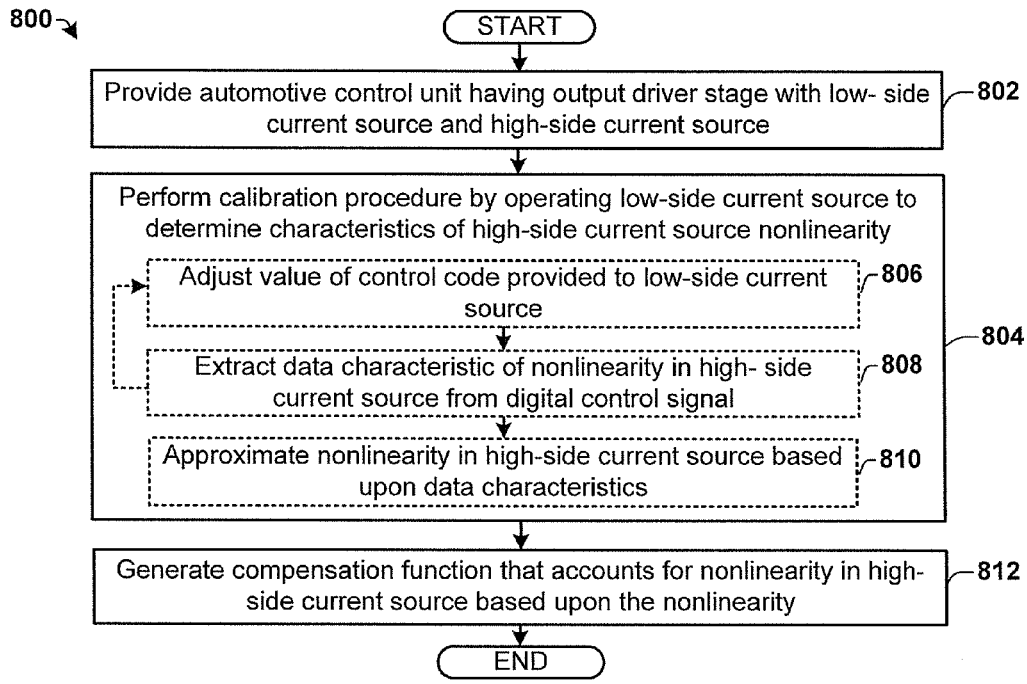
FIG. 8 is a flow diagram of an exemplary method of improving the linearization of a high-side current source in a sensor interface module.

FIG. 8 is a flow diagram of an exemplary method 700 of improving the linearization of a high-side current source in a sensor interface module.

While the disclosed methods (e.g., methods 800-1100) are illustrated and described below as a series of acts or events, it will be appreciated that the illustrated order of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 802, an automotive control unit comprising an output driver stage having a low-side current source and a high-side current source is provided. The high-side current source of the output driver stage is configured to control a voltage that is output to one or more sensors connected to the automotive control unit.

At 804, a calibration procedure is performed by operating the low-side current source to determine one or more data characteristics of a high-side current source nonlinearity.

In some embodiments, the calibration procedure is performed by an iterative process. The iterative process comprises adjusting a value of a control code provided to the low-side current source at 806. When the value of the control code is adjusted, it will change a low-side current output by the low-side current source, causing a change in a digital control signal configured to control a high-side current output by the high-side current source. Based upon the digital control signal and the control code, one or more data characteristics of a nonlinearity in the high-side current source are determined at 808.

At 810, a nonlinearity in the high-side current source is approximated based upon the one or more data characteristics of a nonlinearity in the high-side current source. In some embodiments, the nonlinearity of the high-side current source may be approximated using a lookup table. In some embodiments, the lookup table is configured to store approximate values of a nonlinearity associated with the one or more data characteristics. In such an embodiment, the extracted data characteristics are compared to the lookup table to determine an approximate nonlinearity In other embodiments, the nonlinearity of the high-side current source may be approximated using a sparse lookup table. In such an embodiment, the spare lookup table includes a number of boundary points (e.g., 3-10 boundary points) that define an approximation of the high-side nonlinearity and one or more interpolation coefficients. An adaptive nonlinearity block is configured to interpolate between the boundary points comprised within the sparse lookup table to approximate a nonlinearity. In some embodiments, the interpolation may be performed using a polynomial fit (e.g., a second order polynomial fit). In other embodiments, the interpolation may be performed using a linear fit or a piecewise linear fit (e.g., spline). In yet other embodiments, the interpolation may be performed using a function that describes the saturation with a small number of parameters. For example, $$F(x) = a*b*\frac{x}{(x^n + b^n)^{1/n}}$$

where n=4 and a and b are parameters to be fitted.

At 812, a compensation function used to account for a nonlinearity in the high-side current source is generated from the approximated nonlinearity. In some embodiments, the compensation function may be introduced into the digital control signal before it is provided to the high-side current source to cause the high-side current source to act linearly. In other embodiments, a nonlinear digital control signal of the controller, which controls the high-side current source, is adjusted based upon the compensation function to remove the nonlinearity before it is provided to a receiver.

Figure 9:
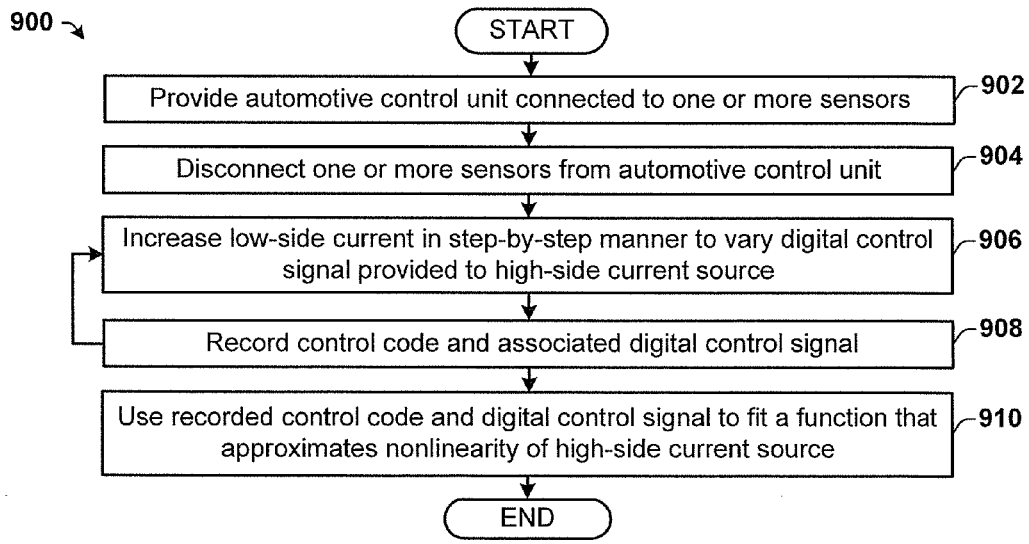
FIGS. 9-11 illustrate flow diagrams of exemplary calibration procedures for the disclosed linearization module.
Figure 10:
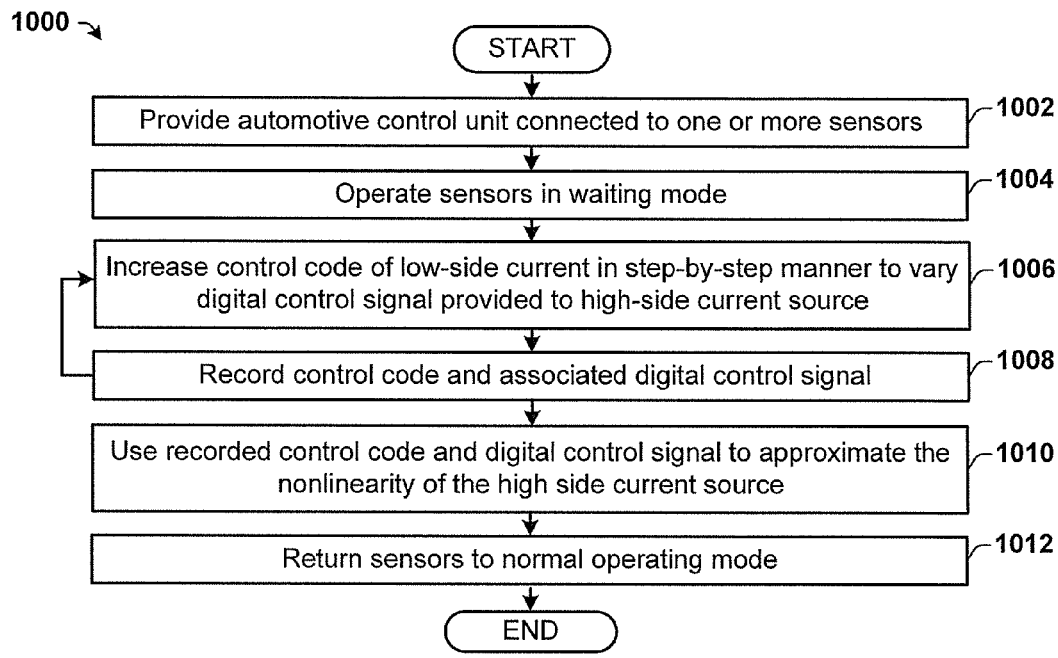
Figure 11:
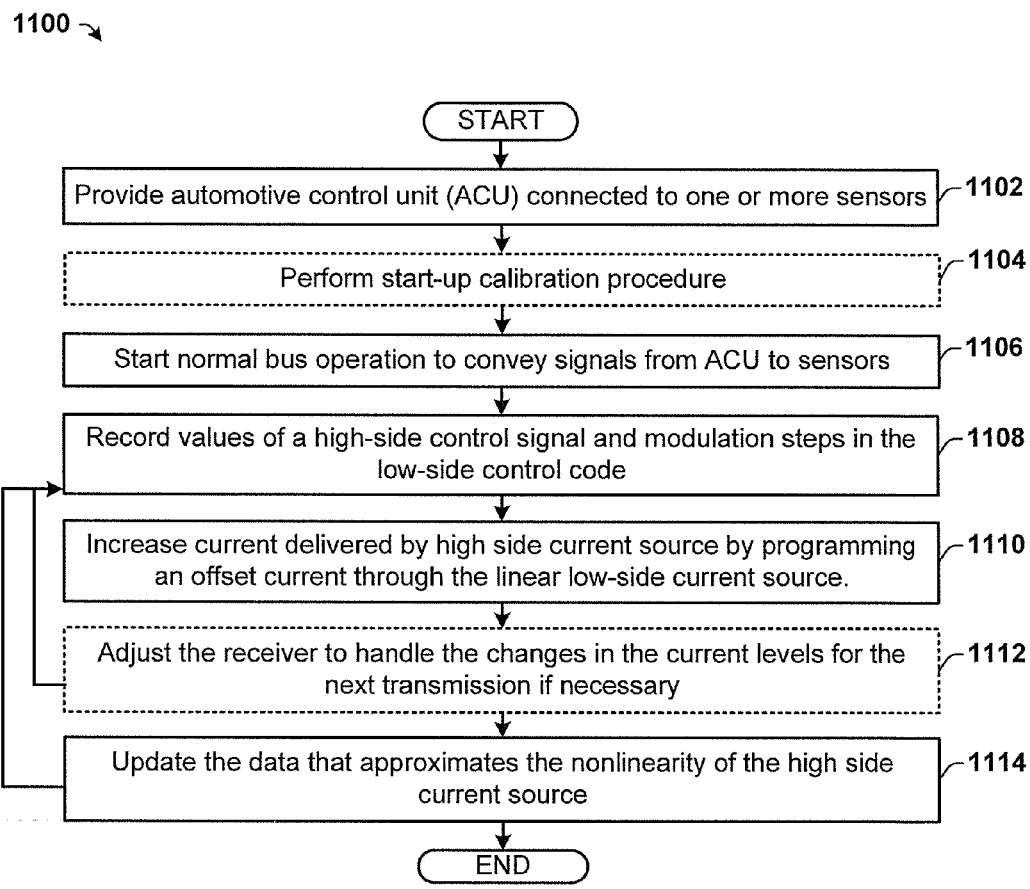

It will be appreciated that in various embodiments the disclosed calibration procedure may be performed at different points of operation of an automotive control unit. FIGS. 9-11 illustrate exemplary calibration procedure that may be implemented by the disclosed linearization module. The calibration procedures in FIGS. 9-11 are examples of some calibration procedures and are not intended to limit the disclosed method and apparatus.

FIG. 9 illustrates a flow diagram of a start-up calibration procedure 900 for the disclosed linearization module.

At 902, an automotive control unit connected to one or more sensors is provided. The automotive control unit comprises closed control loop configured to drive an output driver stage having a low-side current source and a high-side current source. The high-side current source of the output driver stage is configured to control a voltage that is output to the one or more sensors.

At 904, the one or more sensors are disconnected from the automotive control unit (ACU). In some embodiments, a large switching element is configured to selectively decouple the one or more sensors from an automotive control unit having an output driver stage having a high-side current source and a low-side current source.

At 906, the low-side current output from the low-side current source is increased in step-by-step manner to vary digital control signal provided to high-side current source. In some embodiments a control code is provided to a low-side current source to vary the low-side current. Increasing the low-side current source in a step-by-step manner causes the closed control loop to adjust a digital control signal provided to the high-side current source.

At 908, pairs of a control code and an associated digital control signal are recorded.

At 910, the recorded pairs are used to approximate the nonlinearity of the high side current source. In some embodiments, the recorded pairs are used to fit a function that approximates the nonlinearity of the high-side current source.

FIG. 10 illustrates a flow diagram of an alternative calibration procedure 900 for the disclosed linearization module that can be executed without a switching element.

At 1002, an automotive control unit connected to one or more sensors is provided. The automotive control unit comprises closed control loop configured to drive an output driver stage having a low-side current source and a high-side current source. The high-side current source of the output driver stage is configured to control a voltage that is output to the one or more sensors.

At 1004, the one or more sensors are placed in a waiting mode. While in waiting mode, the sensors do not transmit data unless they receive an initial signal from the automotive control unit.

At 1006, the control code that controls the low-side current output from the low-side current source is increased in step-by-step manner to vary digital control signal provided to high-side current source. In some embodiments a control code is provided to a low-side current source to vary the low-side current.

At 1008, pairs of a control code and an associated high-side digital control signal are recorded. Acts 1006 and 1008 may be performed iteratively, so that the control code and the digital control code are recoded at least one more time than a number of unknown variables used in a linearization function.

At 1010, the recorded pairs are used to approximate the nonlinearity of the high-side current source.

At 1012, the sensors are returned to normal operation. In some embodiments, the sensors can be returned to normal operation by sending the first synchronization signal or command that initiates the response of the sensors.

FIG. 11 illustrates a flow diagram of an alternative dynamic calibration procedure 1100 for the disclosed linearization module. In contrast to the calibration procedures disclosed above, the dynamic calibration procedure 1100 can be used to account for changes in the sensor system during operation. For example, the saturation limit changes with temperature, such that if an operating temperature of the control unit changes, the saturation level will change and the linearization function will no longer properly account for the nonlinearity of the high-side current source. Dynamic calibration procedure 1000 accounts for such dynamic changes in temperature.

At 1102, an automotive control unit (ACU) connected to one or more sensors is provided. The automotive control unit comprises closed control loop configured to drive an output driver stage having a low-side current source and a high-side current source. The high-side current source of the output driver stage is configured to control a voltage that is output to the one or more sensors.

At 1104, a start-up calibration procedure may optionally be performed. In some embodiments, the start-up calibration procedure may comprise start-up calibration procedure 900.

At 1106, normal bus operation is started. During normal bus operation, signals are exchanged between the automotive control unit and the one or more sensors (e.g., by way of conductive wires).

At 1108, values a control signal that controls the high-side current source and optionally a low side control code or modulation steps in a low-side control code are recorded. In some embodiments, the low-side control code and the associated control signal are measured while data is being exchanged between the ACU and the one or more sensors.

At 1110, a high side-current delivered by high side current source is increased by programming an offset current through the linear low-side current source. For example, in some embodiments the high-side current may be increased by providing a control code that causes the linear low-side current source to generate an offset current. In some embodiments, a value of the control code is adjusted between receiving from the data one or more sensors.

At 1112, a receiver may optionally be adjusted to handle changes in the high-side current levels for the next transmission.

At 1114, the control code and control signal used to approximate the nonlinearity of the high-side current source is updated.

One or more of acts 1108-1114 may be performed iteratively to follow changes in the high-side current source. For example, during a first iteration, a low side control code and an associated high side control signal are recorded (act 1108). The recorded data is used to update the control code and quiescent current used to approximate the nonlinearity. The quiescent current is then increased by adjusting the control code (act 1110) before a second low-side control code and an associated high side control signal are recorded (act 1108).

Figure 12:
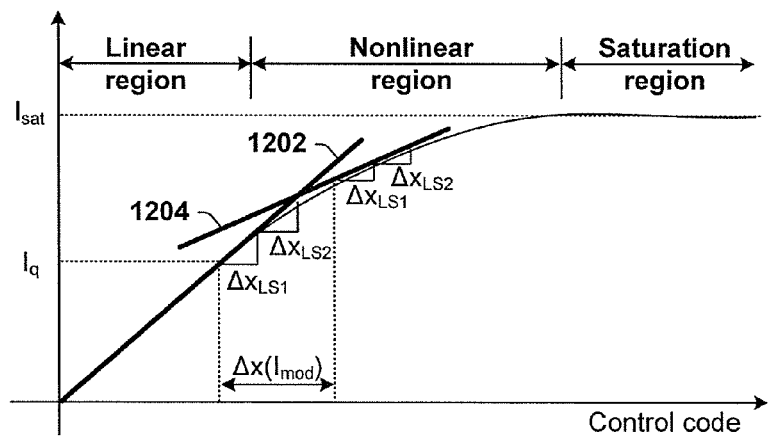
FIG. 12 is a graph showing an example of a dynamic calibration procedure for the disclosed linearization module.

FIG. 12 illustrates a graph 1200 showing a piecewise linear interpolation that approximates nonlinear characteristics of the high-side current source using a sparse lookup. The graph 1200 illustrates a control code provided to a low-side current source on the x-axis and a corresponding output current of the high-side current source on the y-axis.

To perform the interpolation, a low side control code and a corresponding high-side control signal value are captured for a quiescent current and for a modulation step $\Delta x(I_{mod})$ (e.g., for a quiescent current corresponding to a "0" and a modulation step corresponding to a "1"). The control code is then increased by a constant value $\Delta x_{LS1}$, resulting in an increase in the high-side control signal output from the closed control loop (e.g., PID controller). The control signal output from the closed control loop and the low side control code are captured again. Two lines 1202 and 1204 are fitted through the pairs of corresponding points from both measurements. The crossing point of lines 1202 and 1204 is calculated and chosen as a boundary node for the piecewise linear function. If the gain difference between both lines is sufficiently low, the procedure ends here.

If the gain difference between lines 1202 and 1204 is not sufficiently low (e.g., is not below a predetermined value), the control code is increased by a constant value $\Delta x_{LS2}$ and two more lines are fitted through the points belonging to the second low-side controlled current increases (fitted lines not shown on graph 1200). The crossing point with the already existing lines are calculated and added to the list of boundary nodes. Additional points can be subsequently determined by increasing the control code to achieved a desired accuracy of the fit.

It will be appreciated that equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

What is claimed is:

1. An automotive control unit (ACU), comprising;
a reference voltage source configured to generate a reference signal;
an output driver stage having a high-side current source configured to produce a high-side current connected in series at an output node to a low-side current source configured to produce a low-side current;
a closed control loop configured to receive the reference signal and to generate a first signal that operates either the high-side current source or the low-side current source to generate an output signal at the output node; and
a linearization module configured to vary a current of a current source that is not operated to generate the output signal to approximate a nonlinearity of the current source that is operated to generate the output signal, and to use the approximated nonlinearity to mitigate the nonlinearity.

2. The control unit of claim 1, wherein the closed control loop comprises:
a comparator or analog-to-digital converter configured to generate an signal based upon a comparison of the reference signal to a feedback signal received from the output node and dependent upon the high-side current; and
a PID controller configured to receive the signal and to generate a digital control signal that drives the high-side current source to generate the output signal at the output node, wherein the digital control signal is indicative of nonlinearities of the high-side current source since the feedback signal is dependent upon the high-side current.

3. The control unit of claim 2, wherein the linearization module comprises a test controller configured to:
receive the digital control signal that drives operation of the output driver stage;
modify a control code to the low-side current source, which varies a value of the digital control signal by changing a low-side current output from the low-side current source; and
determine one or more data characteristics of the nonlinearity of the high-side current source from the control code and the digital control signal.

4. The control unit of claim 3, wherein the linearization module further comprises:
an adaptive nonlinearity block located between an output of the closed control loop and the high-side current source,
wherein the adaptive nonlinearity block is configured to receive the one or more data characteristics from the test controller, to approximate the nonlinearity based upon the one or more data characteristics, and based upon the nonlinearity to generate a compensation function that mitigates nonlinearities in the digital control signal.

5. The control unit of claim 3, further comprising:
a receiver configured to receive the digital control signal and to demodulate the digital control signal to recover data received from one or more sensors connected to the ACU.

6. The control unit of claim 5, wherein the linearization module further comprises:
an adaptive nonlinearity block located between an output of the closed control loop and the receiver,
wherein the adaptive nonlinearity block is configured to receive the one or more data characteristics from the test controller, to approximate the nonlinearity based upon the one or more data characteristics, and based upon the nonlinearity to generate a compensation function that mitigates nonlinearities in the digital control signal.

7. The control unit of claim 6, further comprising a filter or decimator connected to output of closed control loop and to an input of the adaptive nonlinearity block.

8. The control unit of claim 6, wherein the adaptive nonlinearity block comprises a lookup table configured to store an approximated nonlinearity associated with the control code and the digital control signal.

9. The control unit of claim 6,
wherein the adaptive nonlinearity block comprises a lookup table configured to store boundary points associated with the control code and the digital control signal, and
wherein the adaptive nonlinearity block is configured to perform an interpolation of the boundary points to approximate a nonlinearity of the high-side current source.

10. The control unit of claim 9, wherein the interpolation comprises a piecewise linear interpolation comprising a first line and a second line intersecting a plurality of low side control code and high-side control signal value pairs.

11. The control unit of claim 10, wherein the adaptive nonlinearity block is configured to increase a number lines used in the piecewise linear interpolation if a gain difference between the first and second lines is not below a predetermined value.

12. The control unit of claim 1, wherein the high-side current source comprises current mirror having first PMOS transistor having a first width and a second PMOS transistor having a second width larger than the first width.

13. An automotive control unit (ACU), comprising:
an output driver stage having a high-side current source connected in series to a low-side current source at an output node;
a comparator or analog-to-digital converter configured to compare a reference signal from a reference voltage source to a feedback signal from the output node and to generate an output signal based upon the comparison;
a PID controller configured to receive the output signal and to generate a digital control signal that drives the high-side current source;
a test controller configured to output a control code that varies a low-side current output from the low-side current source, to receive the digital control signal, and to determine one or more data characteristics corresponding to a nonlinearity of the high-side current source from the control code and digital control signal; and
an adaptive nonlinearity block configured to receive the data characteristics, to approximate a nonlinearity of the high-side current source based upon the data characteristics, and utilize the approximated nonlinearity to increase a size of a linear region of operation between a current output from the output driver stage and a signal which is used inside a processing block that makes use of the digital control signal as representation of the current.

14. The control unit of claim 13,
wherein the adaptive nonlinearity block is located between an output of the PID controller and the high-side current source, and
wherein the adaptive nonlinearity block is configured to receive the data characteristics from the test controller, to approximate the nonlinearity based upon the data characteristics, and based upon the nonlinearity to generate a compensation function that modifies the digital control signal to increase a size of a linear region of operation of the high-side current source.

15. The control unit of claim 13, further comprising:
a receiver configured to receive the digital control signal and to demodulate the digital control signal to recover signals output one or more sensors connected to the control unit.

16. The control unit of claim 15,
wherein the adaptive nonlinearity block is located between an output of the PID controller and the processing block; and
wherein the adaptive nonlinearity block is configured to receive the data characteristics from the test controller, to approximate the nonlinearity based upon the data characteristics, and based upon the nonlinearity to generate a compensation function that mitigates the nonlinearity within the digital control signal before it is provided to the processing block.

17. The control unit of claim 16,
wherein the adaptive nonlinearity block comprises a lookup table configured to store boundary points associated with the control code and the digital control signal, and
wherein the adaptive nonlinearity block is configured to perform a linear interpolation of the boundary points to approximate a nonlinearity of the high-side current source.

18. A method of mitigating a nonlinearity of a high-side current source within an automotive control unit (ACU), comprising:
providing an automotive control unit (ACU) comprising an output driver stage having a high-side current source and a low-side current source connected in series at an output node of the ACU;
performing a calibration procedure to generate a compensation function from an approximation the nonlinearity of the high-side current source based upon one or more data characteristics of the nonlinearity determined by varying a low-side current output from the low-side current source; and
utilizing the compensation function to mitigate the nonlinearity in the high-side current source.

19. The method of claim 18, wherein the calibration procedure comprises:
adjusting a value of a control code provided to the low-side current source to vary a low-side current output from the low-side current source;
receiving a corresponding digital control signal configured to drive operation of the high-side current source;
determining the one or more data characteristic of the nonlinearity based upon the digital control signal and the control code; and
approximating the nonlinearity of the high-side current source based upon the one or more data characteristics.

20. The method of claim 18, wherein the calibration procedure comprises:
disconnecting one or more sensors from the ACU;
increasing the high-side current by programming an offset current through the low-side current source;
recording a control code and an associated digital control signal; and
utilizing the control code and the associated digital control signal to approximate the nonlinearity.

21. The method of claim 18, wherein the calibration procedure comprises:
operating one or more sensors connected to the ACU in waiting mode wherein no signals are transmitted between the ACU and the one or more sensors;
providing a control code to the low-side current source to vary a digital control signal that drives the high-side current source;
recording a control code and an associated digital control signal;
utilizing the control code and the associated digital control signal to approximate the nonlinearity; and
operating the one or more sensors in a normal operating mode wherein signals are transmitted between the ACU and the one or more sensors.

22. The method of claim 21,
wherein the control code and the associated digital control signal are measured while data is being exchanged between the ACU and the one or more sensors, and
wherein the value of the control code is adjusted between receiving data from the one or more sensors.

* * * * *